(No Model.)
W. A. OSBORN.
AUTOMATIC AIR PUMP FOR BICYCLES.
No. 556,552. Patented Mar. 17, 1896.
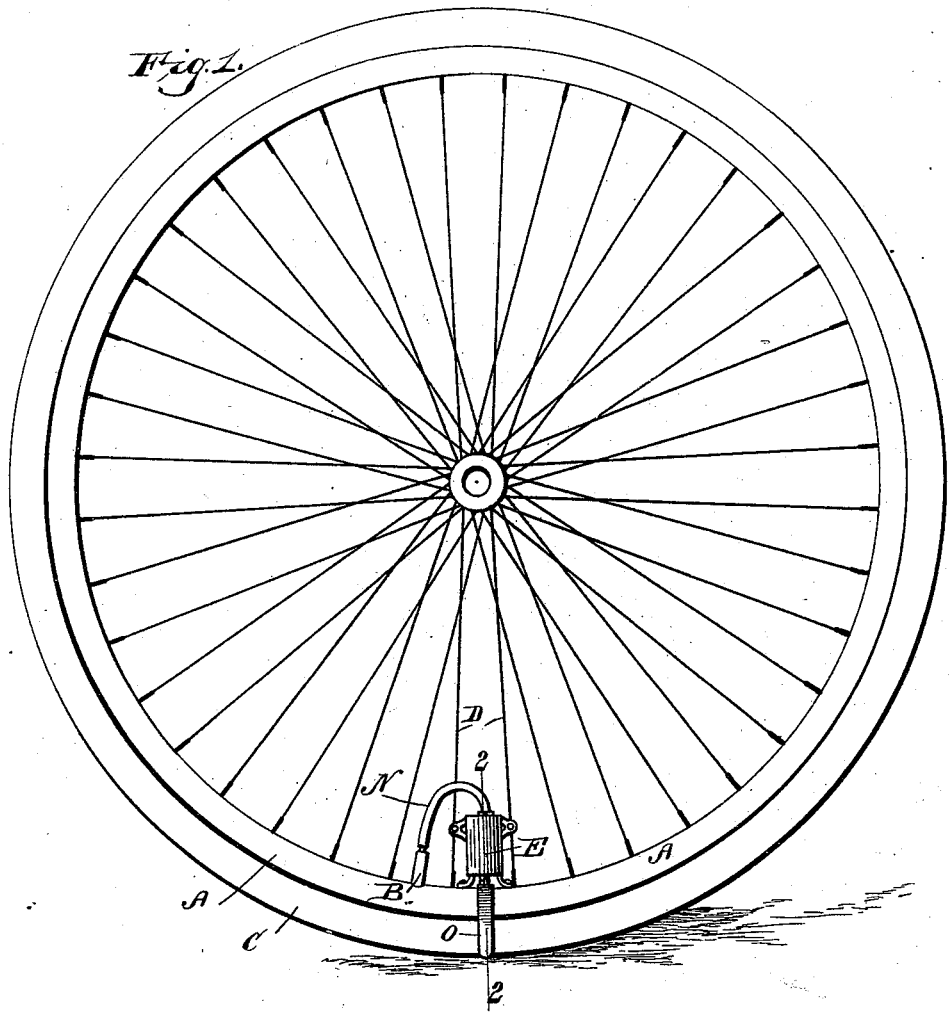
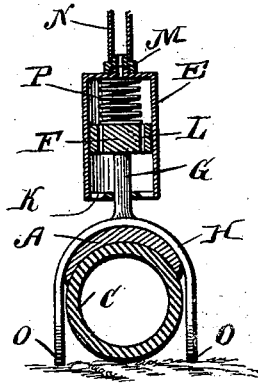
WITNESSES:
H. J. Dieterich
A. M. Cusack
INVENTOR
Walter A. Osborn
BY
Edgar Tate & Co
ATTORNEYS

United States Patent Office.

WALTER A. OSBORN, OF NEW YORK, N. Y.

AUTOMATIC AIR-PUMP FOR BICYCLES.

SPECIFICATION forming part of Letters Patent No. 556,552, dated March 17, 1896.

Application filed July 5, 1895. Serial No. 554,959. (No model.)

*To all whom it may concern:*

Be it known that I, WALTER A. OSBORN, a citizen of the United States, and a resident of New York, in the county of New York and State of New York, have invented certain new and useful Improvements in Automatic Air-Pumps for Bicycles, of which the following is a specification, reference being had to the accompanying drawings, forming a part thereof, in which similar letters of reference indicate corresponding parts.

This invention relates to bicycles, and the object thereof is to provide an improved automatic air-pump for filling the pneumatic tires of bicycles with compressed air; and this invention consists in the combination, with the wheel of the bicycle, of an air-pump which is automatically operated thereby; and the invention further consists in the construction, combination, and arrangement of parts hereinafter described and claimed.

The invention is fully disclosed in the following specification, of which the accompanying drawings form a part, and in which—

Figure 1 is a side elevation of a bicycle-wheel provided with my improved air-pump, and Fig. 2 a vertical section on the line 2 2 of Fig. 1.

In the practice of my invention I secure to the rim A of a bicycle-wheel a tubular air nozzle or nipple B, which is in communication with the pneumatic tire C in the usual manner.

Secured to two of the wires or spokes D and to the rim A, in any desired manner, is the cylinder E of an air-pump, and it will be observed that said cylinder as thus secured in position is stationary.

The cylinder E is provided with a spring-operated piston F, having a shaft G, which extends downwardly and out at the lower end of the cylinder and is provided at its lower end with a yoke H, which is adapted to surround and inclose the rim A and the tire C, as clearly shown in Fig. 2.

The lower end of the cylinder E is provided with perforations or openings K, through which air enters into the cylinder, and the piston F is provided with small openings or perforations L, through which the air may also pass.

The upper end of the cylinder E is provided with a tubular extension M, having a small central bore, and the tubular extension M is adapted to receive or have connected therewith a flexible tube N, the other end of which is adapted to be connected with the air nozzle or nipple B of the tire C.

The operation will be apparent from the foregoing description when taken in connection with the accompanying drawings.

Normally the tire C projects slightly beyond the ends of the yoke H, and the said ends of the yoke H are rounded, as shown at O, and as the wheel is revolved in the operation of the machine the yoke H will be forced upward, and with it the piston F, and the air in the cylinder E will be forced into the tire, as will be readily understood. As the wheel passes beyond the yoke, the tire again expands and the spring P in the cylinder E will force the yoke outward, and at each revolution of the wheel the yoke H and the piston F will be forced inward and the air in the cylinder will be forced into the tire, the reciprocating motion of the piston being caused by the spring P and the yoke H, which strikes the ground at each revolution of the wheel.

If desired, the air-openings in the piston may be provided with automatic valves, and in any event valves must be provided in the usual manner to prevent the escape of the air from the tire.

It is evident that changes in the form, construction, combination, and arrangement of the various parts of my invention may be made without departing from the spirit of my invention, and I therefore reserve the right to make such alterations therein as fairly come within the scope thereof.

It will be seen also that my improved air-pump for bicycles is automatic, and that the same is always in operation when the machine is in motion, and thus the tire will be constantly filled or kept filled with air and will always be in the best possible condition for use.

Having fully described my invention, I claim and desire to secure by Letters Patent—

The combination with the wheel of a bicycle, provided with a pneumatic tire, of an air-pump consisting of a cylinder which is secured to the wheel, one end of said cylinder being provided with a tube which is in communication with the tire and said cylinder being also provided with a spring-operated piston having perforations therethrough, and said piston being provided with a shaft which extends through the end of the cylinder and which is also provided with a yoke adapted to surround or inclose the tire and the rim of the wheel and which is also adapted to come in contact with the ground, substantially as shown and described.

In testimony that I claim the foregoing as my invention I have signed my name, in presence of two witnesses, this 3d day of July, 1895.

WALTER A. OSBORN.

Witnesses:
L. M. MULLER,
M. A. KNOWLES.